Feb. 12, 1946.　　　C. J. JOHNSON　　　2,394,914
VIBRATORY FEEDER
Filed Aug. 14, 1944
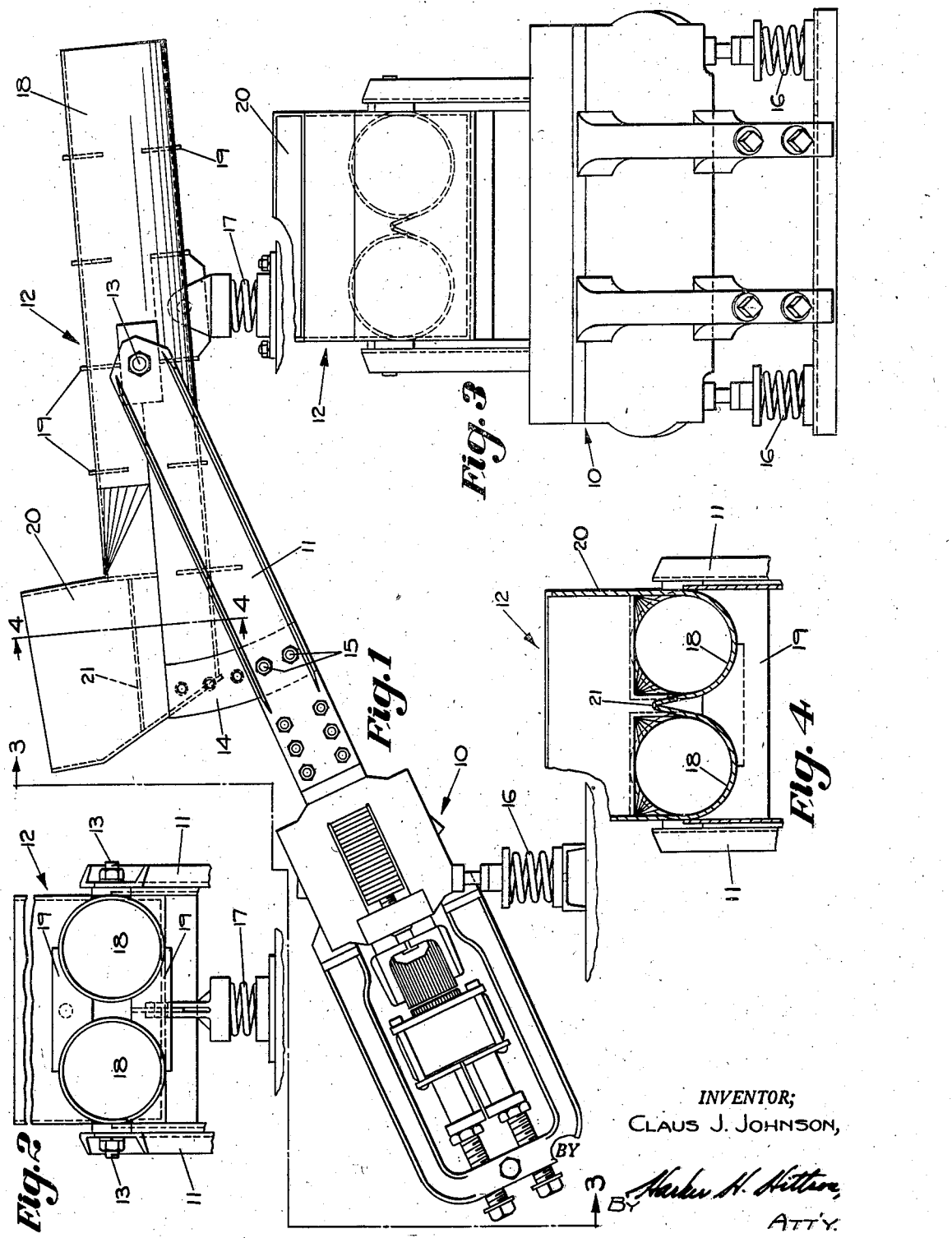
INVENTOR;
CLAUS J. JOHNSON,
BY
ATT'Y.

Patented Feb. 12, 1946

2,394,914

UNITED STATES PATENT OFFICE 2,394,914
VIBRATORY FEEDER

Claus J. Johnson, Columbus, Ohio, assignor to The Jeffrey Company, a corporation of Ohio Application August 14, 1944, Serial No. 549,422

4 Claims. (Cl. 198—220)

This invention relates to a vibratory feeder.

An object of the invention is to provide a feeder of the above mentioned type which is designed particularly to handle fine material such as powdered carbon and to prevent flooding thereof.

Another object of the invention is to provide an improved deck for a vibratory feeder and to provide a vibratory feeder as well, in which the deck is constructed of a plurality of tubes and is capable of handling fine granular material such as powdered carbon or any other similar material which has a tendency to flood.

Other objects of the invention will appear hereinafter, the novel features and combinations being set forth in the appended claims.

In the accompanying drawing:

Fig. 1 is a side elevational view of a vibratory feeder incorporating the features of my invention;

Fig. 2 is a front view showing particularly the deck of the feeder of Fig. 1;

Fig. 3 is a rear view of the feeder of Fig. 1, looking in the direction of the arrows; and Fig. 4 is a sectional view through the feed chamber of the feeder taken on the line 4—4 of Fig. 1, looking in the direction of the arrows.

The feeding of very finely ground or powdered material with a vibratory feeder has long been a troublesome problem because material of this type frequently tends to flood or flow like a liquid even when vibration of the vibratory feeder is stopped, or it frequently tends to flow in an uncontrollable manner when the feeder is in operation. In other words, it frequently does not respond to the amplitude of vibration of the feeder, which response is extremely desirable when the feed rate of any material is to be controlled. I have discovered that material of this type, of which pulverized or powdered carbon or carbon black is one material which is specified purely as illustrative of this general type, can be fed by a vibratory feeder and controlled, flooding being prevented by a special deck construction which shall be described hereinafter.

Referring particularly to Figs. 1 and 3 of the drawing, the feeder includes a vibratory electromagnetic motor 10 which is of well known construction being embodied in vibratory feeders commercially known as Jeffrey-Traylor feeders. Reference is made to the patent to James A. Flint, No. 2,153,243, dated April 4, 1939, for a vibratory screen, which shows in more detail the motor which I employ and which describes in more detail the operation of vibratory devices of this general type.

Rigidly attached to the cross head of the armature of said motor 10 is a pair of spaced arms 11 which with the cross head form a yoke which transmit reciprocatory vibration from the armature of the motor 10 to a deck 12, the arms 11 being pivotally connected to the deck 12 by threaded attaching stub shafts or trunnions and associated nuts designated 13. As illustrated, the angle between the axis of vibration of the motor 10, which is in a plane taken through the axes of the arms 11, may be adjusted with respect to a general plane of the deck 12 which may be considered as a plane intersecting the axes of the tubes thereof by the above mentioned pivotal connection and by an adjustable connection provided by arcuate plates on the deck 12 one of which is seen at 14, said arcuate plates being provided with a plurality of holes which selectively receive nuts and bolts 15 which extend through said plates 14 and the arms 11. If desired, the arms 11 may be connected at a fixed angle to the deck 12. The main frame or main casting of the motor 10 is mounted on shock absorbing means, illustrated as spaced springs 16 the bottoms of which rest upon any desired superstructure, base frame, or floor. The deck 12 is also resiliently supported by a coil spring 17, the bottom of which is received in a cup and supported upon the superstructure, column, or any other desired supporting member.

A portion of my invention lies in the structure of the deck 12. Said deck 12 includes a plurality of cylindrical tubes 18 and in the drawing I have illustrated two such tubes though the number may be increased if desired. The two tubes 18 are rigidly attached together as by attaching cross pieces 19 which are welded to said tubes. At the rear of the deck 12 and forming a part thereof there is a feed chamber 20 which is formed of spaced side walls and front and rear walls. The two tubes 18 extend into the feed chamber 20 but inside said feed chamber the two tubes have their top halves removed and between said two tubes within the feed chamber 20 there is a ridge 21 (see Fig. 4) which constitutes a dividing plate and directs material inside the feed chamber 20 into the bottoms of said tubes 18. The bottom of the chamber 20 is formed by the portions of tubes 18 which extend into said chamber 20.

In the operation of the device, the pulverized or powdered material such as carbon black is fed to the feed chamber 20, the bottom portion of which is supported by the bottom portions of the tubes 18 which extend into said feed chamber 20.

The vibratory motion imparted to the deck 12 by the motor 10 has both a horizontal and perpendicular component relative to the plane of said deck 12 and as is well understood in the art to which this device relates this will cause feeding of the carbon black to the right through the tubes 18. As above mentioned, the tubular formation of the deck 12 will prevent flooding of this fine material and the feeding thereof will be under control at all times.

In the drawing, the axis of the tubes 18 is generally sloping upwardly from the feed end to the discharge end on the right. This is one possible position of operation but it is to be understood that the said device may be either horizontal or may be given a downward slope from the feed end to the discharge end.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention, what I desire to secure by Letters Patent of the United States is:

1. In a vibratory conveyor adapted to convey finely divided material having flooding characteristics, a deck unit and a vibratory motor including an armature, said deck unit including a hopper and separate closed conveyor tubes positioned side by side extending substantially sidewardly from adjacent the bottom of said hopper, said tubes being connected rigidly to said hopper and to each other to vibrate as a unit, a portion of each of said tubes forming a portion of the bottom of said hopper, dividing means in the bottom of said hopper connecting said tubes for directing material to be conveyed from said hopper into said tubes, a yoke adapted to be mounted to said motor armature for transmitting vibratory motions thereof to said hopper and tubes, trunnion means pivotally supporting said hopper and tubes between the arms of said yoke, and means for adjusting the angular relationship between a plane taken through said yoke and a plane taken through said tubes whereby the flooding of material being conveyed may be controlled.

2. A conveyor deck unit adapted to receive vibratory material conveying impulses from an impulse imparting means including a hopper and separate closed conveyor tubes positioned side by side extending substantially sidewardly from adjacent the bottom of said hopper, said tubes being connected rigidly to said hopper and to each other to vibrate as a unit, a portion of each of said tubes forming a portion of the bottom of said hopper, dividing means in the bottom of said hopper connecting said tubes for directing material to be conveyed from said hopper into said tubes, and mounting means forming a part of said deck unit including trunnion means adapted to connect said deck unit with said impulse imparting means and means adapted to cooperate with said impulse imparting means for adjustably fixing the angular relationship between the axis of the conveying impulses imparted by said impulse imparting means and the axes of said tubes.

3. A conveyor deck unit adapted to receive vibratory material conveying impulses from an impulse imparting means including a hopper and separate closed conveyor tubes positioned side by side extending substantially sidewardly from adjacent the bottom of said hopper, said tubes being connected rigidly to said hopper to vibrate therewith and a portion of each of said tubes forming a portion of the bottom thereof, dividing means in the bottom of said hopper connecting said tubes for directing material to be conveyed from said hopper into said tubes, and mounting means forming a part of said deck unit providing for angular adjustment of it with respect to the axis of the conveying impulses delivered by said impulse imparting means.

4. An article of manufacture comprising a conveyor deck adapted to receive vibratory material conveying impulses from a motor and to vibrate as a unit including a hopper and separate closed conveyor tubes extending substantially sidewardly from adjacent the bottom of said hopper, said tubes being positioned side by side and connected rigidly both together and to said hopper, a portion of each of said tubes forming a portion of the bottom of said hopper, and dividing means forming part of the hopper and connecting said tubes for directing material to be conveyed from said hopper into said tubes.

CLAUS J. JOHNSON.